Feb. 13, 1940.   J. THIRY   2,190,391
AIRCRAFT CONTROL
Filed April 14, 1938
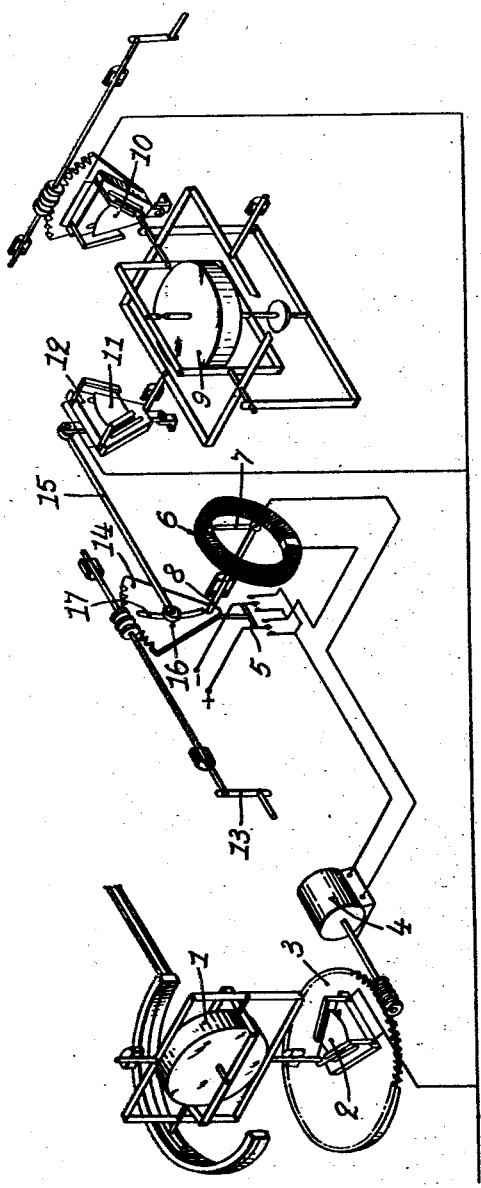
Inventor
Johannes Thiry
Stephen Cantril
ATTY.

Patented Feb. 13, 1940

2,190,391

UNITED STATES PATENT OFFICE 2,190,391

AIRCRAFT CONTROL

Johannes Thiry, Berlin-Sudende, Germany, assignor to Siemens Apparate und Maschinen Gesellschaft mit beschrankter Haftung, Berlin, Germany, a corporation of Germany Application April 14, 1938, Serial No. 202,049
In Germany April 16, 1937

8 Claims. (Cl. 244—76)

This invention relates to controlling mechanism for aircraft and particularly to means for controlling the aircraft in a turn.

The position of an airplane in a curve is correct when the airplane takes the angle of inclined position which is determined by the speed of flight, the angular speed and the earth acceleration. These values are correlated through the equation $$\tan \varphi = \frac{v \cdot \omega}{g}$$

For the determination of the angle of inclined position, a simple pendulum which must take by itself the position corresponding to the apparent vertical line under the influence of the forces appearing in the curve could be sufficient per se. However, additional influences appear which would lead to inexactitudes in the adjustment of the angle of inclined position by means of a pendulum. Thus, the exact value of the angle of inclined position must be determined by other means, for instance, through a computing mechanism. The speed of flight is a value which is particular to the airplane and which eventually can be adjusted. Also the angular speed of an airplane, i. e., the speed of its rotation about the vertical axis, is a value which can be taken according to the circumstances. These facts show that the determination of the correct angle of inclined position puts the attention of the pilot to a hard trial. Thus it will be necessary to endeavour to obtain a simplification of the device, which can be made according to the invention by providing a common adjustment member on the curve instrument for the speed of rotation of the airplane about the vertical axis and for the intended angle of inclined position. Furthermore, by providing between the adjustment member and the displacement device a further adjustable mechanism, it is also possible to take into consideration the influence of the speed of flight with very simple means.

An embodiment of the invention is shown by way of example in the perspective view of the drawing. For maintaining the course of the airplane, a course gyroscope 1 or directional base line is provided which, eventually, can be controlled by a compass and which carries the diaphragm 2 of a bolometer on its vertical precession axis. The bolometer wires are located on the base 3 of the course gyroscope which can be adjusted through a course motor 4. If a curve is to be flown, the course motor 4 is started and it rotates the base 3 with respect to the diaphragm 2 so that a steering current is provided. The flight on a curve lasts as long as the course motor runs. The switch for the course motor is designated by 5. The adjustment of the speed of the course motor is obtained by means of a resistor 6 controlled by contact arm 7 which is carried by an axis 8.

Furthermore, the control device comprises a gyroscopic horizon 9 the horizontal precession axes of which are connected in a known manner to bolometric diaphragms 10 and 11. In correlation with the present invention, the only interesting device is the bolometric control 11 the wires of which are carried by the base 12 for the inclined position. When the base 12 is adjusted with respect to the diaphragm 11, then a differential current proportional to the desired bank of the craft and serving for the control of the transverse inclination of the craft is produced in the same manner as the control of the course by parts 2 and 3. Now, according to the invention, the adjustment of the base 3 and the adjustment of the base 12 are provided by a single control member 13 which controls the position of the resistor arm 7 as well as of the rod 15 and thus of the base 12 through the toothed segment 14. Thus, with this arrangement, it is not necessary for the pilot to effect a plurality of separate control manipulations; on the contrary, it is sufficient for him to effect, by means of the handle 13, a rotation of the toothed segment 14 for a predetermined angle in order to bring the airplane to the correct inclined position in the curve. If it is also necessary to take into consideration the speed of the airplane, this is possible, for instance, by the fact that the end 16 of the rod 15 is caused to slide in a slot 17 which is graduated for indicating the various speeds. Of course, it is possible to replace the manual control of the speed by an automatically operating device.

What I claim is:

1. In a control device for aircraft, the combination with directional and horizon gyroscopes and control elements therefor, of means operable at will for continually and simultaneously shifting the relative positions of said control elements to cause turning and banking of the craft, and means for modifying the relative proportions of said shifting in proportion to the speed of the craft.

2. A control device for aircraft comprising a directional base line, pick-off means controlled by said base line, means responsive to bank of said craft, pick-off means controlled by said bank responsive means, manually operable means having a mechanical advantage connected to said base line and said bank responsive means whereby all of said pick-off means are controlled simultaneously, and means for varying said mechanical advantage whereby the control of said pick-off means is varied in proportion to the speed of the craft.

3. A control device for aircraft comprising a directional base line and bank responsive means, manually operable control means connected to said directional base line and to said bank responsive means for simultaneous control thereof, means for distributing the effect of said manual control in a desired ratio between said base line and said bank responsive means, and means whereby said ratio of distribution may be altered whereby the attitude of said craft on a curve is properly maintained with respect to the rate of turn, banking and speed of said craft.

4. A control device for aircraft comprising a directional gyroscope, pick-off means controlled by said gyroscope, means including an electrical circuit and a variable resistor for controlling said pick-off means, an artificial horizon, pick-off means controlled by the bank indication of said horizon, lever means controlling the position of said pick-off means, manually operable means for simultaneously controlling the variation of said resistor and the movement of said lever means, and means for varying the effective leverage of said lever means whereby the setting of the bank indication pick-off may be modified in proportion to the speed of the craft.

5. A control device for aircraft or the like comprising azimuth and bank control devices, and a single manually operable means for simultaneously and proportionally controlling said devices whereby the banking and turning of said craft are simultaneously and proportionally controlled.

6. A control device for aircraft or the like comprising directional and horizon gyroscopes and control elements therefor, and a single means manually operable for and proportionally shifting the relative positions of said control elements to cause proportional turning and banking of the craft.

7. A control device for aircraft or the like comprising a directional gyroscope and an artificial horizon and control elements therefor, a manually operable element, means connected to said element for controlling said horizon whereby the banking of said craft is controlled, and means simultaneously and proportionally continuously operable by said same manually operable element for actuating the control element of said directional gyroscope for controlling the turning of said craft.

8. A control device for aircraft or the like comprising a directional base line, pick-off means controlled by said base line, means responsive to bank of said craft, pick-off means controlled by said bank responsive means, and a manually operable member connected to both said base line and said bank responsive means for simultaneously and proportionally operating the same whereby all of said pick-offs are simultaneously and proportionally controlled.

JOHANNES THIRY.